United States Patent [19]

Mortensen

[11] Patent Number: 4,669,612
[45] Date of Patent: Jun. 2, 1987

[54] DISK PROCESSING CASSETTE

[75] Inventor: Roger L. Mortensen, Victoria, Minn.

[73] Assignee: Empak Inc., Chanhassen, Minn.

[21] Appl. No.: 703,509

[22] Filed: Feb. 20, 1985

[51] Int. Cl.⁴ ............................................ B65D 85/30
[52] U.S. Cl. ................................... 206/454; 134/182;
206/334; 211/41
[58] Field of Search ............... 206/454, 328, 311, 309,
206/334; 211/40, 41; 134/182

[56] References Cited

U.S. PATENT DOCUMENTS

| | | | |
|---|---|---|---|
| 2,555,594 | 6/1951 | Markovitz | 206/309 |
| 2,725,143 | 11/1955 | Winebaugh et al. | 206/309 |
| 3,923,156 | 12/1975 | Wallestad | 206/454 |
| 3,961,877 | 6/1976 | Johnson | 206/454 |
| 4,160,504 | 7/1979 | Kudlich et al. | 206/454 |
| 4,471,716 | 9/1984 | Milliren | 206/454 |
| 4,493,418 | 1/1985 | Johnson | 206/328 |

Primary Examiner—George E. Lowrance
Assistant Examiner—Jimmy G. Foster
Attorney, Agent, or Firm—Hugh D. Jaeger

[57] ABSTRACT

Processing cassette for processing of hard rigid memory disks including a plurality of open supported opposing disk dividers for supporting a plurality of disks in alignment by the dividers of the cassette. The cassette is intended for use in automated robotic processing of the disks while in the cassette. The wafer cassette includes similar mirror image like opposed ends with deep wide downwardly inverted arches. The dividers are supported by two pairs of horizontal supports secured to the ends, providing for both upper and lower open process wash areas between each of the dividers for passage of liquids during automated robotic processing. Surfaces of the cassette are non-porous and extremely smooth. All edges and corners are radiused facilitating quick and effective drying of the cassette during robotic processing. On-center processing is provided for the disk processing cassette, where the carrier center of gravity is on-center for an axis of centrifugal disk processing machinery. Each of the dividers, in upper and lower cross sections, are geometrically configured for maximum passage and ease of entry of fluids during processing.

6 Claims, 7 Drawing Figures

DISK PROCESSING CASSETTE

BACKGROUND OF THE INVENTION

1. Field of the Invention

The present invention relates to a disk processing cassette for processing of hard rigid memory disks, and more particularly, pertains to a disk cassette with geometrically configured upper and lower teeth, upper and lower wash ports, rounded edge members, deep arched ends, reinforced horizontal supports, and extremely smooth surfaces for carrying a plurality of aligned disks for processing, including on-center, centrifugal, both immersion and in-line one-disk-at-a-time processing.

2. Description of the Prior Art

The prior art disk cassettes have been heavy, bulky, and expensive; and, did not provide for sufficient open areas for efficient processing of disks or rapid cassette drying features. Prior art cassettes are not prone to maintaining structural integrity due to structural limitations; and, often distort or flex in physical geometrical shape to the point of structural breakdown, as well as breakage or bowing distortion of the disk and its carried circuitry. Sheer physical weight and bulk in prior art cassettes, as well as blunt unsmooth exterior teeth edges or limited access end portions, did not allow for sufficient or proper processing of wash fluids to penetrate the interior cavities of the cassette in an efficient, sufficient, and expedient manner. After processing, delays often occur due to long liquid process wash evacuation times which are hampered by irregular cassette surfaces, squared non-rounded edges, and the use of porous fibered plastic cassette materials to provide for drip drying, of the cassette surfaces.

The present invention overcomes the disadvantages of the prior art by providing a disk processing cassette for processing of hard rigid memory disks, or the like, which includes opposing ends with deep and wide open areas; providing for maximum open surface areas for process solution spraying; and providing upper and lower process spray ports between upper and lower reinforced geometrically shaped dividers for maximum interior exposure to process spray solutions. Fast and efficient drying is provided by incorporating the use of poly-butylene-terephthalate (PBT) of like material, with extremely smooth surfaces, rounded member edges, radiused vertex slots, filled and smooth corners, and ramped surfaces and lower recess areas promoting rapid drainage and drying. The cassette provides for on-center processing of disks in automated integrated circuit processing equipment, and includes vertical robotic strengthening bars. The disk processing cassette can be made from PBT or other like material, and can be accepted by present day robotic disk automated machines.

SUMMARY OF THE INVENTION

The general purpose of the present invention is to provide a disk processing cassette for processing of disks, and also provides for on-center processing of the cassette by present day advanced robotic disk processing equipment. The disk processing cassette includes an integral structure of the cassette with strategically located mirror image ends having deep reverse arch spray areas. The cassette also includes geometrically configured reinforced dual profile geometrically configured disk dividers, with multilevel spray ports between the disk dividers providing open, non-restricted areas for inner cassette process wash entry for processing. The cassette is constructed of smooth surfaced, non-porous, poly-butyleneterephthalate (PBT) material having rounded edges and corner members, ramped surfaces, and radiused vertex slots incorporated throughout facilitating fast, efficient drainage and drying of the cassette. The cassette is of a least minimal weight, providing for a lower unit cost to the processor.

According to one embodiment of the present invention, there is provided a disk processing cassette for processing of disks, including opposing mirror image like ends with downwardly descending, inverted arches with rounded edge members, including an open area thereabove; rectangular lower beveled edge open portions; right and left sides, including upper edge members; forward and rearward vertical support robotic pickup members in support of the upper members; a plurality of upper and lower reinforced disk dividers having geometrically distinct shaped upper and lower teeth, the tops of which slopes and the exterior portion being more round in shape than the interior portion of the teeth; radiused vertex disk indexing slots; upper and lower process wash ports; opposing horizontal longitudinal structural supports, secured to the front left end and the rear right end at the upper and mid-portions of the dividers; and ramped lower tooth portions joining vertical reinforced lower members, the lower members being positioned between the left and right ends, lower members, including bottom rounded edges, recessed edges, and positioning grooves. Smooth surfaces, ramped surfaces, radiused vertex slots, and rounded edge members throughout the cassette facilitate rapid cassette drainage and drying. The downwardly arched ends provide for maximum open end areas. The upper and lower dividers and corresponding upper and lower process wash slots, with geometrically dual rounded face configured teeth, provide for minimum surface side wall areas for maximizing processing functions, thereby providing fully functional, strategically located, low wash entry profile, least weight disk cassette of structural integrity for on-center processing of disks.

One significant aspect and feature of the present invention is a disk processing cassette which is fully functional including opposing mirror image ends, and includes an extremely large open area on each end for non-restricting processing of silicon disks for integrated circuits.

Another significant aspect and feature of the present invention is a disk processing cassette which provides for on-center processing of integrated circuits. The disk processing cassette provides that the center of gravity of the disk cassette carrier is on-center of the axis of integrated circuit centrifugal processing machinery. Vertical ear tabs are provided for to assist in structural integrity for robotic automation.

A further significant aspect and feature of the present invention is a disk processing cassette which provides two sets of two sets of upper process wash slots and lower, larger process wash slots between the dividers.

An additional significant aspect and feature of the present invention is a disk processing cassette which has an extremely low process wash entry profile, and is of minimal weight with maximum structural integrity for present day automated processing equipment.

Still another significant aspect and feature of the present invention are sloping and rounded surfaces and rounded corners for facilitating rapid drainage of process fluids from the surfaces. All corners are sloped, rounded, smooth and filled, thereby preventing particle buildup or particulate contamination during processing of the disk. All edges are radiused for ease of packaging and handling. All edges are also radiused for draining of fluids.

A yet further significant aspect and feature of the present invention is a disk cassette using non-porous PBT, and extremely smooth cassette surfaces to provide for quick efficient process wash fluids drainage and drying.

A still further significant aspect and feature of the present invention are teeth like dividers with radiused slot vertexes, an upper profile tooth having a profile different than the profile of a lower tooth, having a long cross-section profile with a relatively sharper angle including exterior teeth backs and interior teeth portions of small profiles which provide for additional rigidity of the dividers and the disk cassette carrier, while at the same time provide for effective fluid drainage.

Having thus described embodiments of the present invention, it is the principal object hereof to provide a disk processing cassette having multi-level procss wash ports and large deep end wash ports while maintaining structural integrity for processing.

One object of the present invention is a fully functional, on-center disk processing cassette which provides for non-restrictive processing during steps of processing.

Another object of the present invention is a disk processing cassette which is produced of poly-buthleneterephthalate, PBT, or like material, which enhances smooth non-porous surfaces at an economical cost which is impervious to high temperatures.

An additional object of the present invention is a disk processing cassette with sloping, rounded, filled, or a combination thereof, extremely smooth surfaces for quick egress and drying of process wash fluids.

An additional object of the present invention is a disk processing cassette which utilizes dual profile cross-section teeth providing for structural integrity of the disk processing cassette.

BRIEF DESCRIPTION OF THE DRAWINGS

Other objects and many of the attendant advantages of the present invention will be readily appreciated as the same becomes better understood by reference to the following detailed descriptions when considered in connection with the accompanying drawings, in which like reference numerals designate like parts throughout the figures thereof and wherein.

DESCRIPTION OF THE PREFERRED EMBODIMENTS

Figure 1:
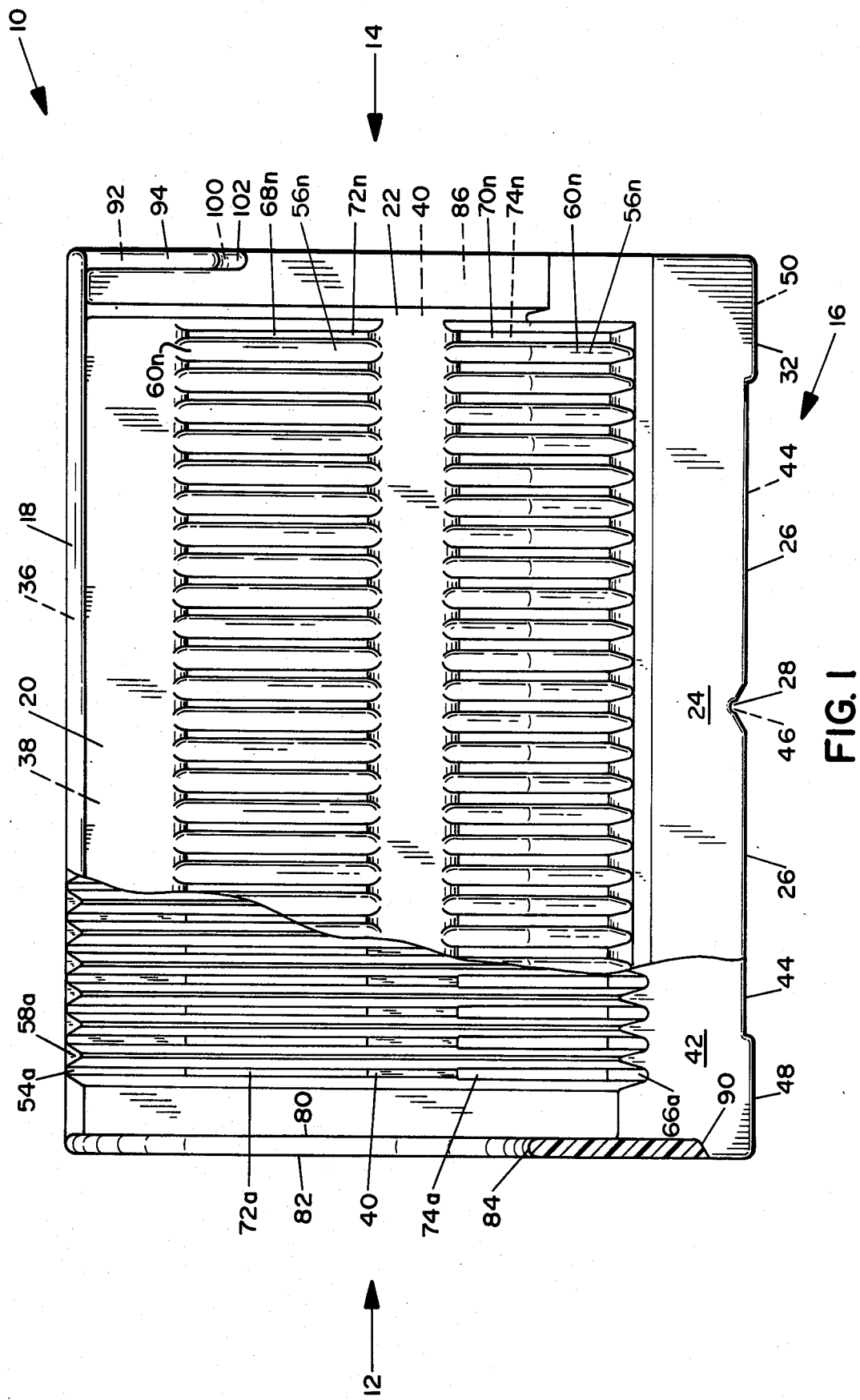
FIG. 1 illustrates a plan view of a disk processing cassette including a portion partially cut away.
Figure 2:
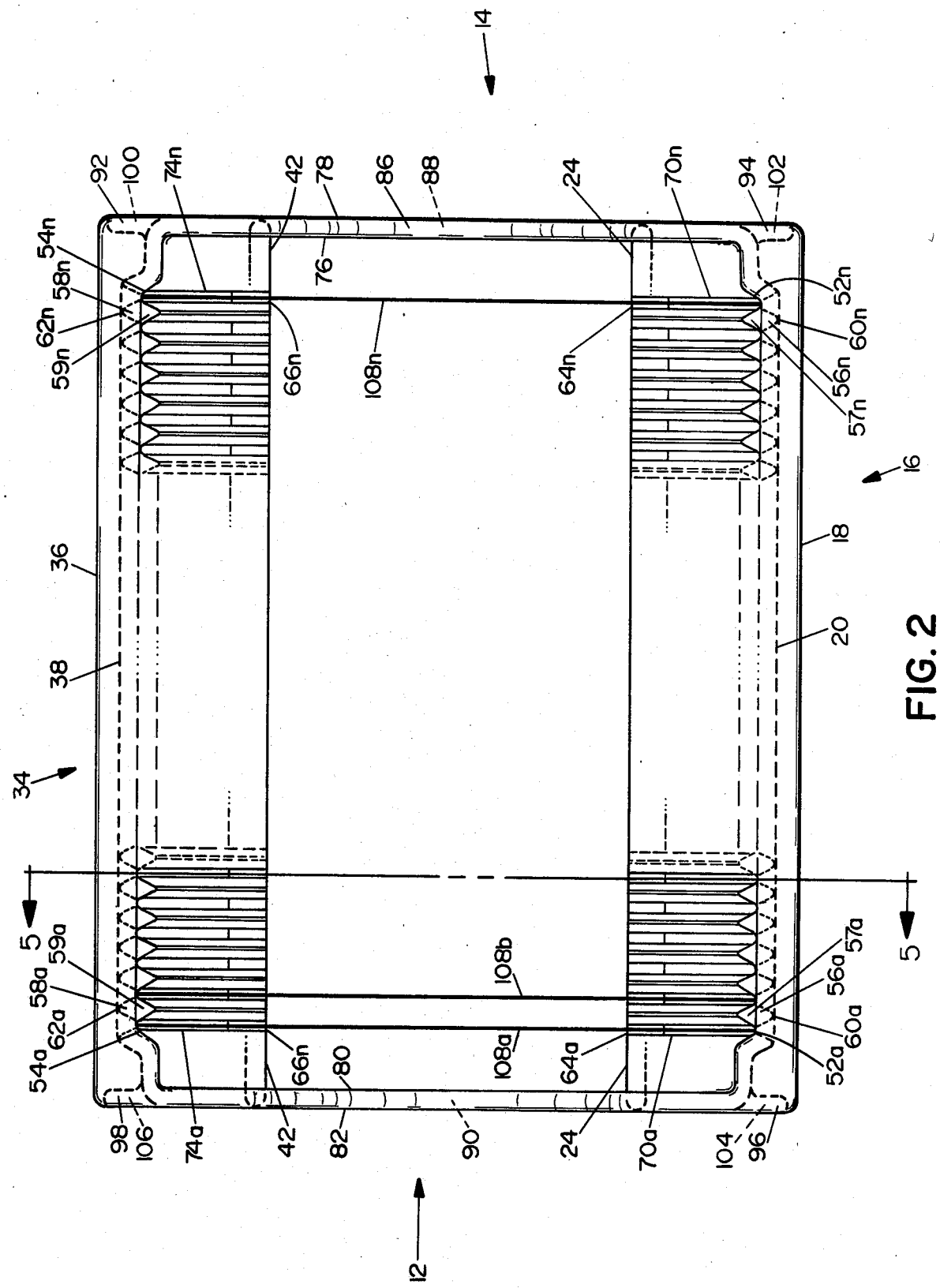
FIG. 2 illustrates a top view.

FIG. 1 illustrates a plan view of a disk processing cassette 10, the present invention, for processing of disks, including a partially cut away section. Reference is also made to FIGS. 2-7 in the following description. The cassette 10 includes opposing mirror imaged like left front end 12 and right rear end 14, also illustrated in FIGS. 3 and 4, including open areas, as later described; a right side 16, including an upper edge member 18; a right upper horizontal structure support member 20; a right lower horizontal structure support member 22; and a lower member 24, inclduing rounded recessed lower edge 26 and right rounded edge ramped positioning groove 28 positioned between the left and right lower rounded edges 30 and 32 of right lower member 24. Likewise, a left mirror image side 34, including an upper edge member 36; a left upper horizontal support 38; a left lower horizontal structure support 40; and a lower member 42, including rounded and recessed lower edge 44 and rounded left ramped positioning groove 46 positioned between the left and right lower rounded edges 48 and 50, respectively, of left lower member 42. A plurality of right radiused vertex indexing slots 52a-52n and left radiused vertex indexing slots 54a-54n, opposing the right indexing slots, are also provided above lower members 24 and 42. A plurality of geometrically configured dual profile in line disk dividers, the cross section of the upper portion being different than that of the lower cross section, assume geometrical shapes of rounded teeth 56a-56n and 58a-58n, including rounded tooth backs 60a-60n and 62a-62n. The teeth are rounded on the exterior and interior teeth end points as illustrated further in FIGS. 6 and 7. The teeth are in opposing alignment with respect to each other, as shown in FIG. 2, and are supported in turn by upper edge members 18 and 36, upper horizontal structural members 20 and 38, and lower horizontal structural members 22 and 40 beneath which the vertical descent of the teeth change direction and are inwardly and downwardly ramped toward and connected to lower members 24 and 42. The members extend between the front left and rear left ends 12 and 14, respectively, of the cassette 10. Lower ramped vertex radiused slot surfaces 64a-64n and 66a-66n provide for tangential perimeter contact of the disk; as illustrated in FIG. 5. Lower structural support members 22 and 40 provide additional standy tangential perimeter contact with the disks.

Right side 16, upper process wash ports 68a-68n, and lower process wash ports 70a-70n are fashioned between the grids formed by dual profile teeth 56a-56n, right upper horizontal structural support 20, right lower horizontal support member 22, and right lower member 24. In a simular fashion left side 34, upper process wash ports 72a-72n, and lower process wash ports 74a-74n are formed between the grids formed by dual profile teeth 58a-58n, and left upper horizontal structural support member 38, left lower horizontal structural support 40, and left lower member 42, providing for maximum fluid transfer during liquid processing or other liquid entry at both upper and lower side areas of the disk cassette 10. Lower process wash slots 70a-70n and 74a-74n assume a broader and wider horizontal opening, because of dual profiles as later described, than upper process wash slots 68a-68n and 72a-72n. Narrow, non-blunt, profiled external rounded teeth backs allow maximum flow of liquid processing entry.

Figure 3:
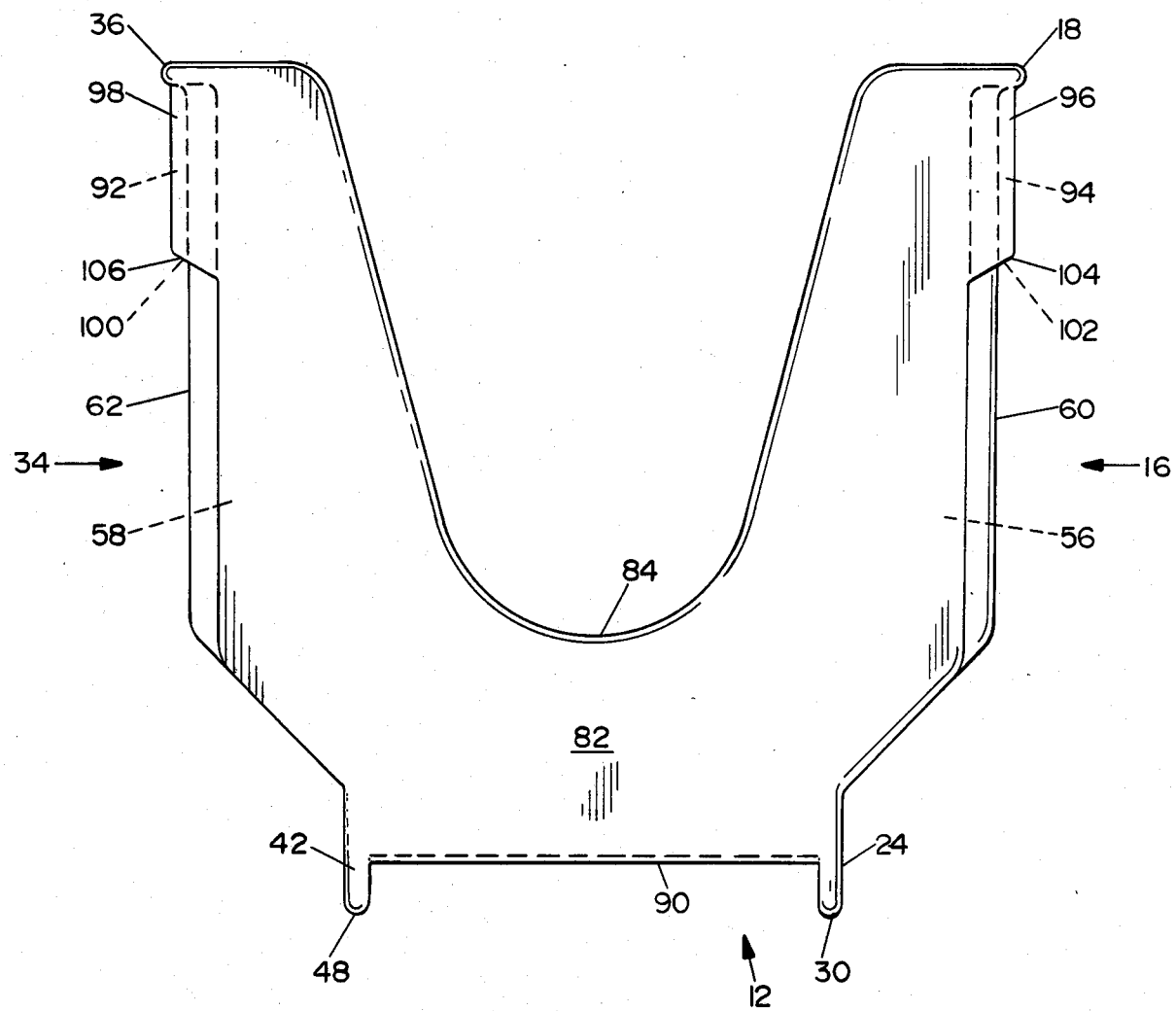
FIG. 3 illustrates the left front end view.
Figure 4:
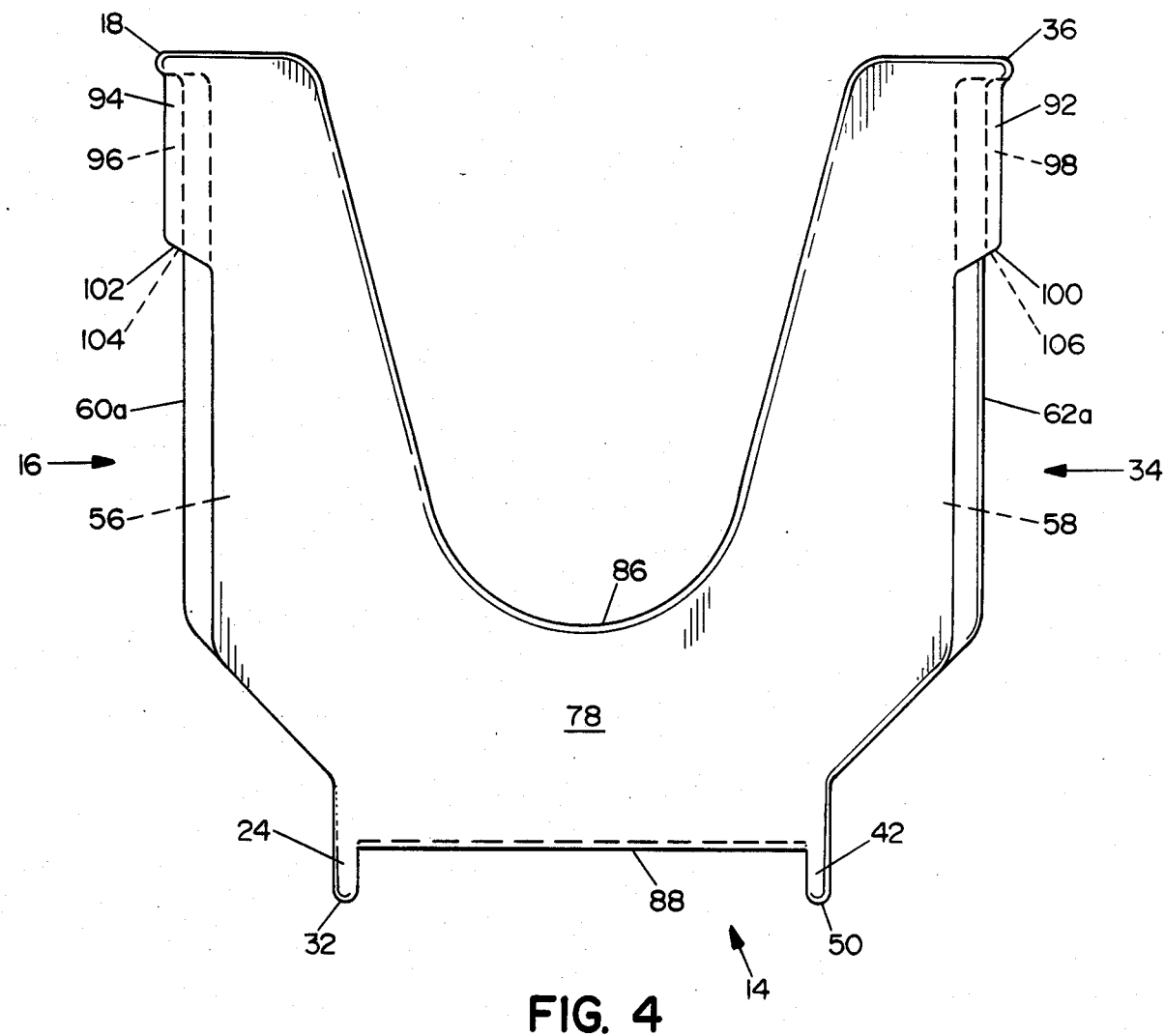
FIG. 4 illustrates the right rear end view.
Figure 5:
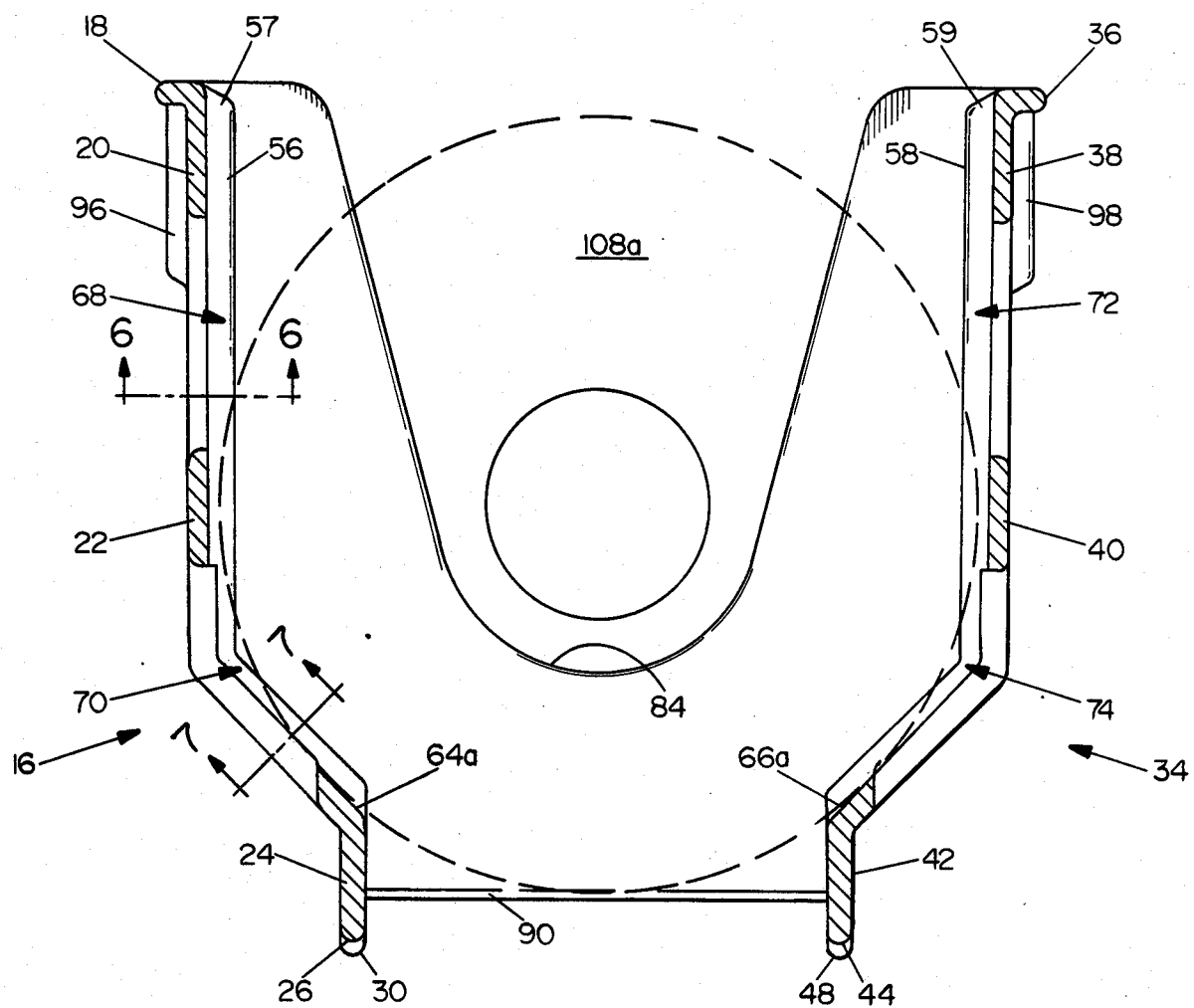
FIG. 5 illustrates a view taken along line 5—5 of FIG. 2.

The cassette includes mirror image opposing rear end 14 and front end 12, containing interior side 76, exterior side 78, interior side 80, and exterior side 82, respectively, reverse arch open areas above rounded edge reversed arches 86 and 84, respectively, and rectangular open areas below beveled edges 88 and 90 respectively, as also illustrated in FIGS. 3 and 4.

Vertical edge support bar members 92, 94, 96, and 98 with inwardly descending ramped bottom surfaces 100, 102, 104, and 106 extend downwardly and inwardly from the underside ends of upper members 18 and 36 and connect at ends 14 and 12 adjacent to surfaces 78 and 82, for support of the outer ends of upper members 18 and 36 for functioning as robotic pickup members, as utilized in automatic processing equipment.

Figure 6:
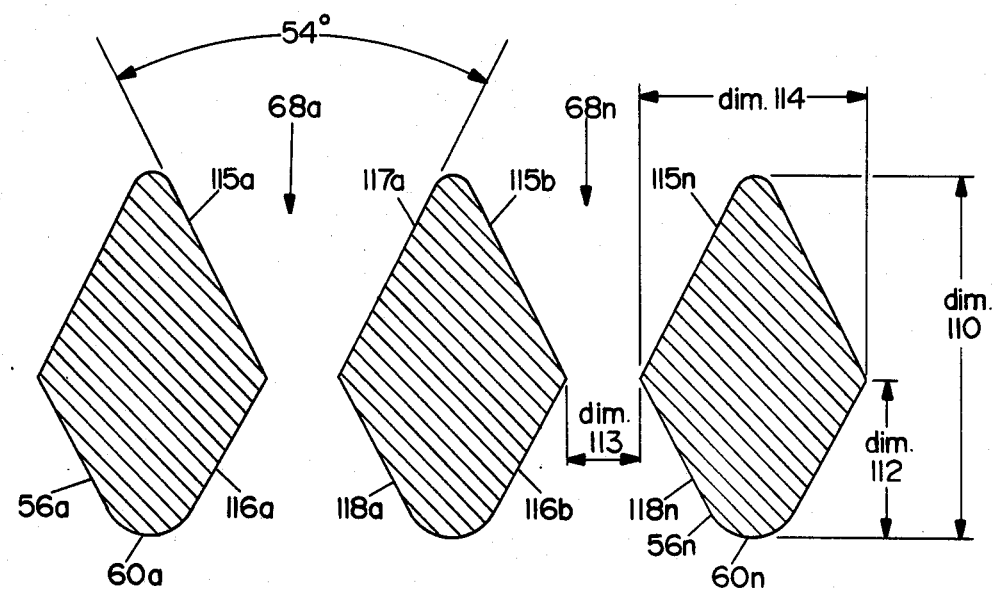
FIG. 6 illustrates a divider in cross-section taken along line 6—6 of FIG. 5; and, FIG. 7 illustrates a divider in cross-section taken along line 7—7 of FIG. 5.
Figure 7:
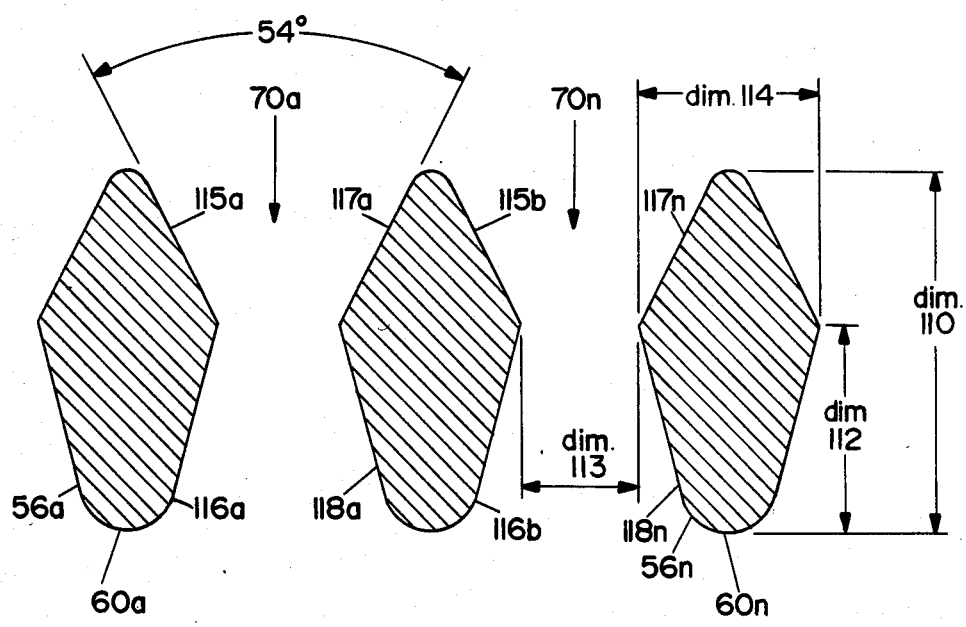

FIG. 2 illustrates a top view of the disk processing cassette 10 wherein all numerals correspond to those elements previously described. Particularly illustrated are disks 108a–108n supported in vertex radiused slots 52a–52n and 54a–54n and resting upon vertex radiused slot surfaces 64a–64n and 66a–66n in between disk divider teeth 56a–56n and 58a–58n. The unique geometrical shape of the top portion of the dual cross-section divider teeth 56a–56n and 58a–58n, with rounded exterior and interior tooth ends, are described in detail and as illustrated in FIGS. 5, 6, and 7 which facilitate fluid flow. Vertical edge bar 92, 94, 96, and 98 are shown positioned beneath upper members 18 and 36.

FIG. 3 illustrates a front view of the front end 12 where all numerals correspond to those elements previously described. Particularly illustrated is the rounded edge reversed arch 84, and the wide open area above the arch. The lower inwardly beveled edge 90 and end portions of lower members 24 and 42, form a rectangular drainage recess area. Reverse arch 84 with inner and outer, very smooth, drainage promoting surfaces 80 and 82, respectively, link and join right side 16 and left side 34. A surface 82 also acts as a bearing surface.

FIG. 4 illustrates a rear view of the rear end 14 of the cassette 10, and is a mirror like image of the front end 12, as shown in FIG. 3. Particularly illustrated is the rounded edge reversed arch 86 and the wide open area above the arch. Lower inwardly beveled edge 88 and end portions of lower members 24 and 42, form a rectangular drainage recess area. Reverse arch 86, with the very smooth drainage promoting inner and outer surfaces 76 and 78, respectively, link and join the right side 16 with the left side 34. Surface 78 also functions as a bearing surface.

FIG. 5 particularly illustrates a view taken along line 5—5 of FIG. 2 where all numerals correspond to those elements previously described, showing tangential contact of disk 108a within the radiused vertex slots of lower member ramped surfaces 64a and 66a. The disks 108a–108n center and align in the radiused vertex indexing slots 52a–52n and 54a–54n, formed by dual profile teeth 56a–56n and 58a–58n. Horizontal structural supports 22 and 40 position substantially near and about the 0300 and 0900 clock positions of the disks 108a–108n, and offer auxiliary standby tangential point contact to counter any transient movement of the disks 108a–108n during cassette movement. Also shown are multi-level process wash upper ports 68 and 72 and lower wash ports 70 and 74, providing for maximized areas of pressurized flow of process wash entry and exposure to those liquids. The tops 57a–57n and 59a–59n of teeth 56a–56n and 58a–58n, also of FIG. 2, are ramped to promote quick efficient drainage of liquids from the cassette 10.

FIGS. 6 and 7 illustrate a section view of the dual profile divider teeth 56a–56n taken along line 6—6 of FIG. 5 and line 7—7 of FIG. 5, where all numerals correspond to those elements previously described. Dual profile teeth 56a–56n and simular opposing teeth 58a–58n, the latter not shown for sake of brevity, have two separate and distinct upper and lower profiles, namely that profile of section 6 and FIG. 6 and the other of profile section 7 and FIG. 7. The tooth profiles change just below the horizontal support structure 22, from that of FIG. 6 and section line 6—6, to that of FIG. 7 and section line 7—7, and continue downwardly until changing direction to proceed inwardly and downwardly to meet lower edge member 24. In FIGS. 6 and 7, the interior tooth angle between interior tooth walls 115a and 117a remain constant at about 54°, and dimension 110 remains substantially constant throughout. As dimension 112 of FIG. 7 is increased, a longer, deeper, rounded tooth back 60a–60n results. The tooth width dimension 114 of FIG. 6 decreases in FIG. 7 as dimension 113 of FIG. 7 and the wash slot width 70n increases, allowing for wider process wash slots 70a–70n throughout the cassette 10. Flow process wash entering process wash ports 68a–68n and 70a–70n enter with little profile resistance directly through the ports. A large portion of those particles not entering directly, can deflect off teeth walls 116a–116n and 118a–118n providing entry to engage in the chemical processes of disk processing instead of being deflected in a backward manner. Such would occur if the teeth were not rounded or of a flat tooth back construction where the liquids would contribute nothing to the processing of the disks. The larger dimension 113 of FIG. 7 of the lower process wash port 70a–70n and the decreased angle between tooth walls 116a and 118a enhance a more effective pressure wash process as the ease of process wash entry is increased.

MODE OF OPERATION

The disks 108a–108n are positioned in the disk cassette for processing. The cassette can also be used for storage or for transportation, although the intended purpose of the present invention is for automatic processing by robotic automated processing equipment. The disk processing cassette 10 can be utilized in on-center processing equipment or other types of processing equipment. The disk processing cassette 10 is unique in being functional for all types of present robotic processing equipment in a horizontal or a vertical mode.

The dual profile teeth, utilized in the cassette 10, provide support for structural integrity along lengthy vertical tooth spans and ramped tooth spans, and provide for sufficiently wide and vertically tall wash ports.

The dividers support the disks by providing for maximized upper and lower level process wash ports for automated processing steps. Fluids, as well as air or gaseous vapors, pass through the multiple open areas of the dividers, and about and through the open ends especially during wash processes.

Virtually all of the flat surfaces and rounded surfaces of the cassette are of an extremely smooth finish. All edges are rounded or radiused, and all inner or outer corners are filled or smoothed to provide for rapid egress and drainage of wash liquids from the internal and external surfaces of the cassette 10. The cassette is able to withstand chemicals.

Various modifications can be made to the present invention without departing from the apparent scope thereof.

I claim:

1. Processing cassette comprising:

a. opposing mirror image sides including a large upper structural support, a mid-horizontal structural support, and a lower edge member, a plurality of inwardly extending lower and upper teeth from each of said sides, lower and upper wash slots between each of said teeth, said lower wash slots being wider in width than said upper wash slots separated by said mid-horizontal structural support, said lower teeth being more compressed in width than the upper teeth of said dividers, said teeth being radius vertexed, opposing inward and outward edges of each of said teeth being rounded back providing for fluid flow about each of said teeth, inward faces of said teeth being at angle providing for fluid flow therebetween, said angle being at about 54°; and,
b. front and rear end opposing mirror image members, each of said members connected between said sides and including downwardly extending reversed arches, open space of each of said arches of a greater longitudinal length than horizontal width.

2. Cassette of claim 1 wherein all surfaces are rounded and smooth providing for rapid fluid flow and fluid drainage.

3. Cassette of claim 1 wherein each of said lower edge member extend downwardly beyond said front and rear end members providing for drainage.

4. Cassette of claim 1 including a vertical edge bar extending outwardly and parallel from each end of each of said front and rear end opposing mirror image members and extending partially downwardly in height to a mid point between said large upper structural support and said mid-horizontal structural support.

5. Cassette of claim 1 including an open recessed longitudinal area in each of said lower edge members providing for fluid flow and fluid drainage.

6. Cassette of claim 1 wherein said rounded back edges of each of said teeth providing for optimized fluid flow through each of said sides.

* * * * *